(12) United States Patent
Tsuzaki et al.

(10) Patent No.: US 10,727,935 B2
(45) Date of Patent: Jul. 28, 2020

(54) SCHEDULER APPARATUS AND SCHEDULING METHOD

(71) Applicant: MITSUBISHI ELECTRIC CORPORATION, Tokyo (JP)

(72) Inventors: Shogo Tsuzaki, Tokyo (JP); Katsuyuki Motoyoshi, Tokyo (JP); Shigenori Tani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/476,355

(22) PCT Filed: Feb. 6, 2017

(86) PCT No.: PCT/JP2017/004240
§ 371 (c)(1),
(2) Date: Jul. 8, 2019

(87) PCT Pub. No.: WO2018/142618
PCT Pub. Date: Aug. 9, 2018

(65) Prior Publication Data
US 2020/0044731 A1  Feb. 6, 2020

(51) Int. Cl.
*H04B 7/195* (2006.01)
*H04B 7/185* (2006.01)
(Continued)

(52) U.S. Cl.
CPC .......... *H04B 7/195* (2013.01); *H04B 7/1858* (2013.01); *H04B 7/18513* (2013.01); *H04B 7/18515* (2013.01); *H04B 7/18554* (2013.01)

(58) Field of Classification Search
CPC ............ H04B 7/195; H04B 7/18513; H04B 7/18515; H04B 7/18554; H04B 7/1858
See application file for complete search history.

(56) References Cited

U.S. PATENT DOCUMENTS 6,377,208 B2 * 4/2002 Chang .................. G01S 5/0054
342/357.43
8,712,321 B1 * 4/2014 Dankberg .......... H04B 7/18513
455/12.1
(Continued)

FOREIGN PATENT DOCUMENTS

JP 2004-140721 A 5/2004

OTHER PUBLICATIONS

Extended European Search Report issued in corresponding European Application No. 17895421.0 dated Dec. 13, 2019.

*Primary Examiner* — Dominic E Rego
(74) *Attorney, Agent, or Firm* — Birch, Stewart, Kolasch & Birch, LLP

(57) ABSTRACT

A scheduler apparatus includes: a calculation unit to determine, on the basis of a time required for switching from a first orbiting satellite that is an orbiting satellite to which an earth station is currently directed to a second orbiting satellite candidate that is an orbiting satellite as a candidate for a second orbiting satellite that is an orbiting satellite to which the earth station is directed next, a future expected throughput between the earth station and the first orbiting satellite, and a future expected throughput between the earth station and the second orbiting satellite candidate, the second orbiting satellite and a switching timing at which the earth station switches a directed satellite from the first orbiting satellite to the second orbiting satellite; and an interface to transmit information on the second orbiting satellite and the switching timing determined by the calculation unit.

13 Claims, 7 Drawing Sheets

(51) Int. Cl.
   *H04B 7/155*   (2006.01)
   *H04W 36/00*   (2009.01)

(56) References Cited

U.S. PATENT DOCUMENTS

| | | |
|---|---|---|
| 9,749,928 B2* | 8/2017 | Benammar ........ H04B 7/18541 |
| 2004/0137842 A1 | 7/2004 | Iwata et al. |
| 2007/0025296 A1* | 2/2007 | Jung .................... H04W 36/32 370/331 |
| 2007/0135040 A1* | 6/2007 | Draim ................ H04B 7/18541 455/12.1 |
| 2016/0323800 A1 | 11/2016 | Ulupinar et al. |
| 2017/0041830 A1* | 2/2017 | Davis ................ H04W 36/0088 |
| 2017/0047986 A1* | 2/2017 | Petrovic ................ H04L 5/1469 |
| 2017/0105153 A1* | 4/2017 | Ashrafi ............... H04W 36/245 |
| 2017/0126307 A1* | 5/2017 | Wyler ............... H04W 72/0453 |
| 2017/0127323 A1* | 5/2017 | Peleg .................. H04B 7/2125 |
| 2017/0366251 A1* | 12/2017 | Ravishankar ...... H04B 7/18584 |
| 2018/0172823 A1* | 6/2018 | Tyc ........................ B64G 1/242 |

* cited by examiner

SCHEDULER APPARATUS AND SCHEDULING METHOD

FIELD

The present invention relates to a scheduler apparatus and a scheduling method that determine a satellite to which an earth station that communicates with a plurality of satellites is directed.

BACKGROUND

Earth observation satellites that photograph the surface of the earth by using a synthetic aperture radar (SAR) or optical lenses are operated on an orbit around the earth, in addition to communication satellites that communicate with communication terminals on the earth. When the number of orbiting satellites being operated is small, an earth station keeps following, that is, tracking an orbiting satellite that passes through a visible range thereof, thereby being able to establish a feeder link with the orbiting satellite. However, when the number of communication satellites, that is, the number of orbiting satellites being operated is increased with an increase of communication demand, a plurality of orbiting satellites may pass through the visible range of the earth station, and this makes it difficult to use the operating method of the earth station described above. From the viewpoints of the cost and construction site, it is not preferable to construct the same number of earth stations as the number of operated orbiting satellites, and thus it is desired to efficiently track orbiting satellites with less earth stations.

Patent Literature 1 discloses a technique of, in a satellite communication system constituted by a plurality of quasi-zenith satellites, deriving the time required for switching a satellite to be tracked from the coordinates of the respective satellites, and selecting the satellite to be tracked such that the downtime of an earth station is minimized.

CITATION LIST

Patent Literature

Patent Literature 1: Japanese Patent Application Laid-open No. 2004-140721

SUMMARY

Technical Problem

However, according to the conventional technique described above, a satellite to be tracked next by an earth station is determined only by using, as an index, the elongation between a satellite being tracked and a satellite that is a candidate of a tracking-switching destination. Therefore, in a case where a satellite being operated is a low earth orbit (LEO) satellite that travels at a low angle of elevation, at which the rain attenuation amount is large, for a longer time than a quasi-zenith satellite, there is a problem in that, in some cases, the throughput of the earth station is not improved even when the tracked satellite is switched.

The present invention has been achieved in view of the above problem, and an object of the present invention is to provide a scheduler apparatus that can efficiently operate an earth station.

Solution to Problem

In order to solve the above problems and achieve the object, a scheduler apparatus includes a calculation unit to determine, on a basis of a time required for switching from a first orbiting satellite that is an orbiting satellite to which an earth station is currently directed to a second orbiting satellite candidate that is an orbiting satellite as a candidate for a second orbiting satellite that is an orbiting satellite to which the earth station is directed next, a future expected throughput between the earth station and the first orbiting satellite, and a future expected throughput between the earth station and the second orbiting satellite candidate, the second orbiting satellite and a switching timing at which the earth station switches a directed satellite from the first orbiting satellite to the second orbiting satellite. The scheduler apparatus further includes an interface to transmit information on the second orbiting satellite and the switching timing determined by the calculation unit.

Advantageous Effects of Invention

The scheduler apparatus according to the present invention has an effect where it is possible to efficiently operate an earth station.

DESCRIPTION OF EMBODIMENTS

A scheduler apparatus and a scheduling method according to embodiments of the present invention will be described below in detail with reference to the accompanying drawings. The present invention is not limited to the embodiments.

Embodiment.

Figure 1:
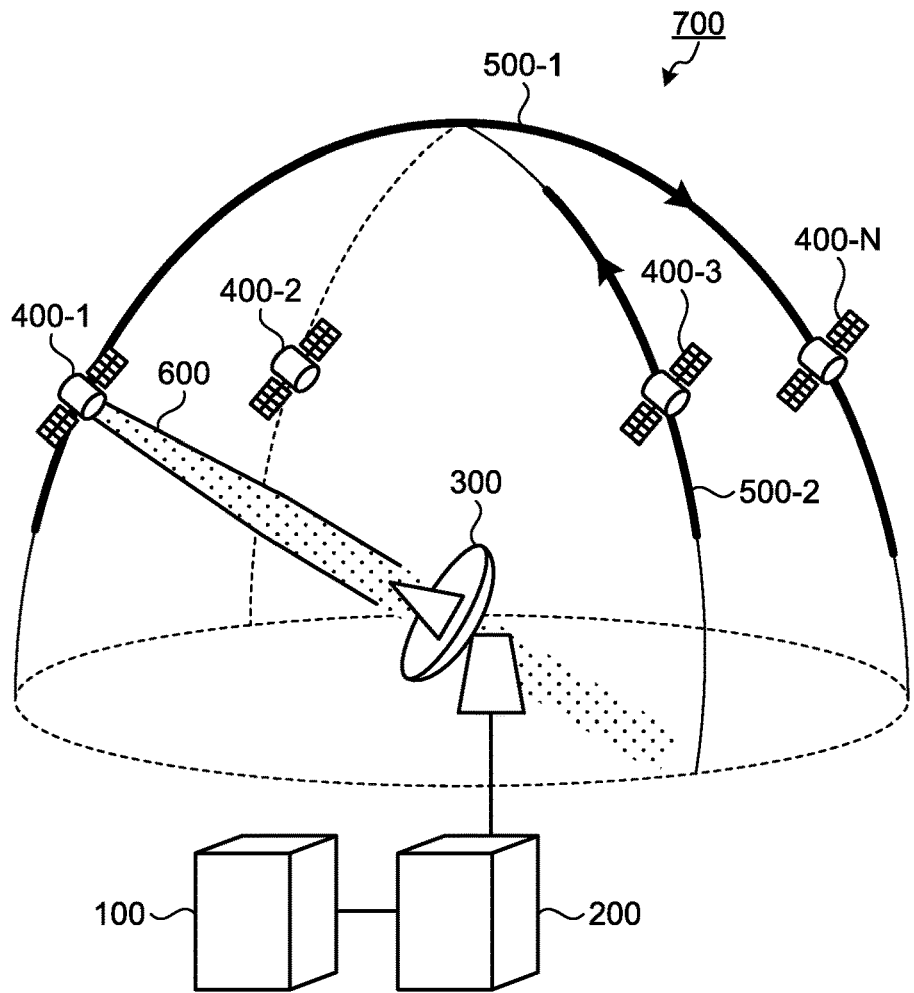
FIG. 1 is a schematic diagram illustrating an example of a satellite system configured by applying a scheduler apparatus.

FIG. 1 is a schematic diagram illustrating an example of a satellite system 700 configured by applying a scheduler apparatus 100 according to an embodiment of the present invention. The satellite system 700 includes the scheduler apparatus 100, a control station 200, an earth station 300, and satellites 400-1 to 400-N. The value of N is a natural number equal to or more than two. The satellites 400-1 to 400-N are artificial satellites such as communication satellites that provide communication services, optical satellites that observe the earth, or SAR satellites. Further, the satellites 400-1 to 400-N are orbiting satellites each orbiting on either of satellite orbits 500-1 and 500-2. In FIG. 1, among the satellites 400-1 to 400-N, the satellite 400-1 to which a beam 600 is radiated from the earth station 300 can transmit data to the earth station 300. In the following descriptions, the satellites 400-1 to 400-N may be called satellites 400 when these satellites are not distinguished from one another, and the satellite orbits 500-1 and 500-2 may be called satellite orbits 500 when these orbits are not distinguished from each other.

In the satellite system 700 illustrated in FIG. 1, although the earth station 300, the control station 200, and the scheduler apparatus 100 are separate apparatuses from one another, this configuration is merely an example, and these apparatuses can be implemented as one apparatus. The configuration of the satellite system 700 illustrated in FIG. 1 is merely an example, and the number of the satellites 400, the number of the satellite orbits 500, and the number of the earth stations 300 are not limited to those in the configuration illustrated in FIG. 1. For example, the configuration of the satellite system 700 may be such that the satellite system 700 includes a data relay satellite on a geostationary orbit and the data relay satellite relays a data signal transmitted from the satellite 400 to transmit the signal to the earth station 300.

Figure 2:
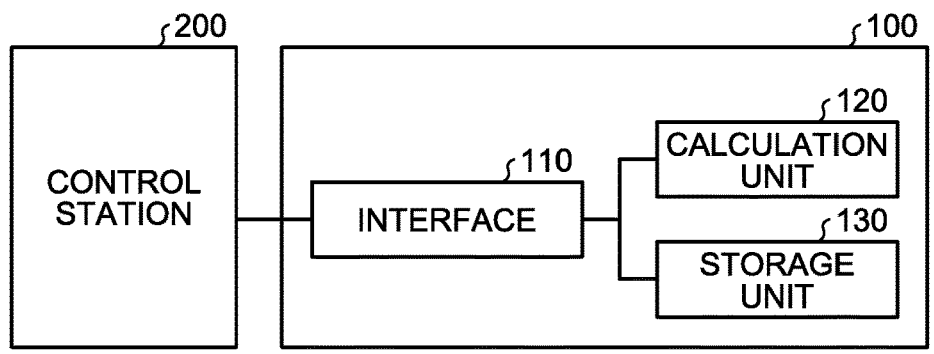
FIG. 2 is a block diagram illustrating an example configuration of the scheduler apparatus.

FIG. 2 is a block diagram illustrating an example configuration of the scheduler apparatus 100 according to the present embodiment. The scheduler apparatus 100 includes an interface 110 that transmits and receives information to and from the control station 200 present outside the scheduler apparatus 100; a calculation unit 120 that determines the satellite 400 to which the earth station 300 is directed; and a storage unit 130 that stores information. The scheduler apparatus 100 in the satellite system 700 determines the satellite 400 to which the earth station 300 is directed, that is, the satellite 400 with which the earth station 300 communicates.

The control station 200 controls the earth station 300 and the satellite 400. The control station 200 transmits, to the earth station 300 and the satellite 400, control information such as scheduling information output from the scheduler apparatus 100.

Figure 3:
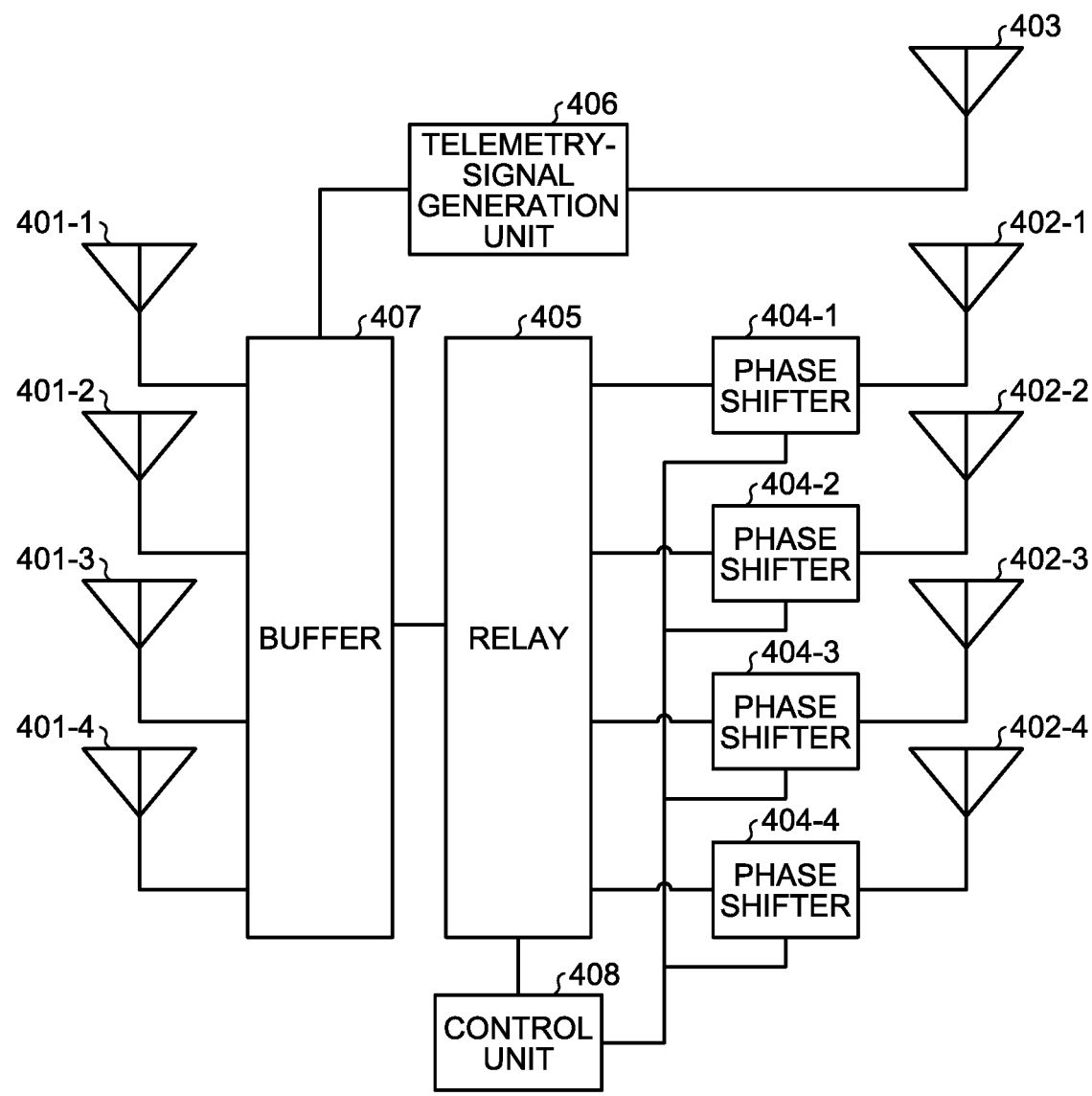
FIG. 3 is a block diagram illustrating an example configuration of a satellite.

FIG. 3 is a block diagram illustrating an example configuration of the satellite 400-1 according to the present embodiment. Because the satellites 400-1 to 400-N have an identical configuration to one another, the satellite 400-1 is described as an example. The satellite 400-1 includes reception antennas 401-1 to 401-4 receiving signals from the earth station 300 or a terminal (not illustrated) on the surface of the earth; transmission antennas 402-1 to 402-4 transmitting signals to the earth station 300 or a terminal (not illustrated) on the surface of the earth; and a telemetry-signal transmission antenna 403 that transmits a telemetry signal indicating an internal state of the satellite 400-1. The satellite 400-1 also includes phase shifters 404-1 to 404-4 each adjusting the phase of the signal transmitted from an associated one of the transmission antennas 402-1 to 402-4; a relay 405 that relays signals between the reception antennas 401-1 to 401-4 and the transmission antennas 402-1 to 402-4; and a telemetry-signal generation unit 406 that generates a telemetry signal. The satellite 400-1 further includes a buffer 407 that temporarily stores therein signals received by the reception antennas 401-1 to 401-4 and a control unit 408 that controls the relay 405 and the phase shifters 404-1 to 404-4. In the following descriptions, the reception antennas 401-1 to 401-4 may be called reception antennas 401 when these antennas are not distinguished from one another, the transmission antennas 402-1 to 402-4 may be called transmission antennas 402 when these antennas are not distinguished from one another, and the phase shifters 404-1 to 404-4 may be called phase shifters 404 when these shifters are not distinguished from one another.

In the satellite 400-1, the relay 405 is configured to include a filter, an amplifier, a demultiplexer, a switch, and a multiplexer, for example.

The relay 405 may be configured to further include a modulator and a demodulator in addition to the filter and the like described above so as to allow regenerative relaying. The relay 405 is an existing satellite-borne relay. Further, the buffer 407 is not an essential component in the satellite 400-1. For example, in a case where the satellite 400-1 is a communication satellite and it is not necessary to store therein a signal received by the reception antenna 401, the satellite 400-1 may have a configuration in which the reception antennas 401 and the relay 405 are directly connected to each other. In the present embodiment, a case where the satellite 400-1 includes the buffer 407 is described as an example. The satellite system 700 can be configured such that an optical line is used between the satellite 400 and the earth station 300 and between the satellite 400 and a data relay satellite or both an optical line and a wireless line are used between them. The configuration of each apparatus is varied depending on the mode of line between the apparatuses. However, the mode of line between the apparatuses is not specifically limited to any mode in the present embodiment.

In the satellite 400-1, the transmission antennas 402 are phased array antennas. As the phase shifter 404 controls the phase of a signal transmitted from the associated transmission antenna 402, the satellite 400-1 can change the radiating direction of the signal transmitted from the transmission antenna 402, that is, the phased array antenna. The satellite 400-1 may be configured to include a general antenna and a movable reflecting mirror in place of the phase shifter 404 and the transmission antenna 402, that is, the phased array antenna, and change the radiating direction of a signal transmitted from the general antenna by changing the orientation of the reflecting mirror.

The control unit 408 controls the phase shifter 404 in accordance with a control signal transmitted from the earth station 300, such as a control signal indicating the radiating direction of the signal transmitted from the transmission antenna 402, thereby changing the radiating direction of the signal to be transmitted.

The telemetry-signal generation unit 406 generates, as internal information on the satellite 400-1, information on the data accumulation amount that indicates the amount of data accumulated in the buffer 407, for example. The telemetry-signal generation unit 406 transmits a telemetry signal including the generated internal information on the satellite 400-1 from the telemetry-signal transmission antenna 403 to the earth station 300. The telemetry-signal generation unit 406 may generate data type information indicating the type of data accumulated in the buffer 407 as the internal information and transmit the data type information in a state included in the telemetry signal. Further, the telemetry signal generation unit 406 may transmit two pieces of information, that is, the data accumulation amount and the type of data in a state included in the telemetry signal.

The scheduler apparatus 100 is an apparatus that determines the satellite 400 to which the earth station 300 is directed on the basis of, for example, the amount of the accumulated data in the buffer 407 included in a telemetry signal that is transmitted from the satellite 400 and is acquired via the earth station 300 and the control station 200 and coordinate data of all the satellites 400 stored in advance in the storage unit 130. In the present embodiment, the scheduler apparatus 100 determines the satellite 400 to which the earth station 300 is directed and the timing at which the earth station 300 switches the directed satellite 400 such that the throughput of data received by the earth station 300 from the satellite 400 is maximized. The scheduler apparatus 100 generates a control signal indicating the satellite 400 to which the earth station 300 is directed and including the switching timing at which the earth station 300 switches the directed satellite 400, and transmits the control signal to the earth station 300. The earth station 300 uses the control signal received by the earth station itself and transmits the control signal to the satellite 400.

The scheduler apparatus 100 does not necessarily need to store coordinate data of the satellites 400 in the storage unit 130 in advance. For example, in a case where the satellite 400 includes coordinate data of itself in a telemetry signal and transmits the telemetry signal to the earth station 300 regularly, it is possible that the scheduler apparatus 100 acquires the telemetry signal from the earth station 300 via the control station 200 and acquires the coordinate data of the satellite 400 from the telemetry signal. The method of acquiring the coordinate data of the satellite 400 by the scheduler apparatus 100 is not limited to those described above, and may be any appropriate method in accordance with its implementation.

In addition, as for the constitution of the control signal indicating the satellite 400 to which the earth station 300 is directed, it suffices that the control signal has an appropriate format in accordance with the configuration of the satellite 400, while taking into consideration a control signal for controlling the phase shifter 404 of the satellite 400, a control signal for controlling the orientation of the reflecting mirror of the satellite 400, or the like.

Figure 4:
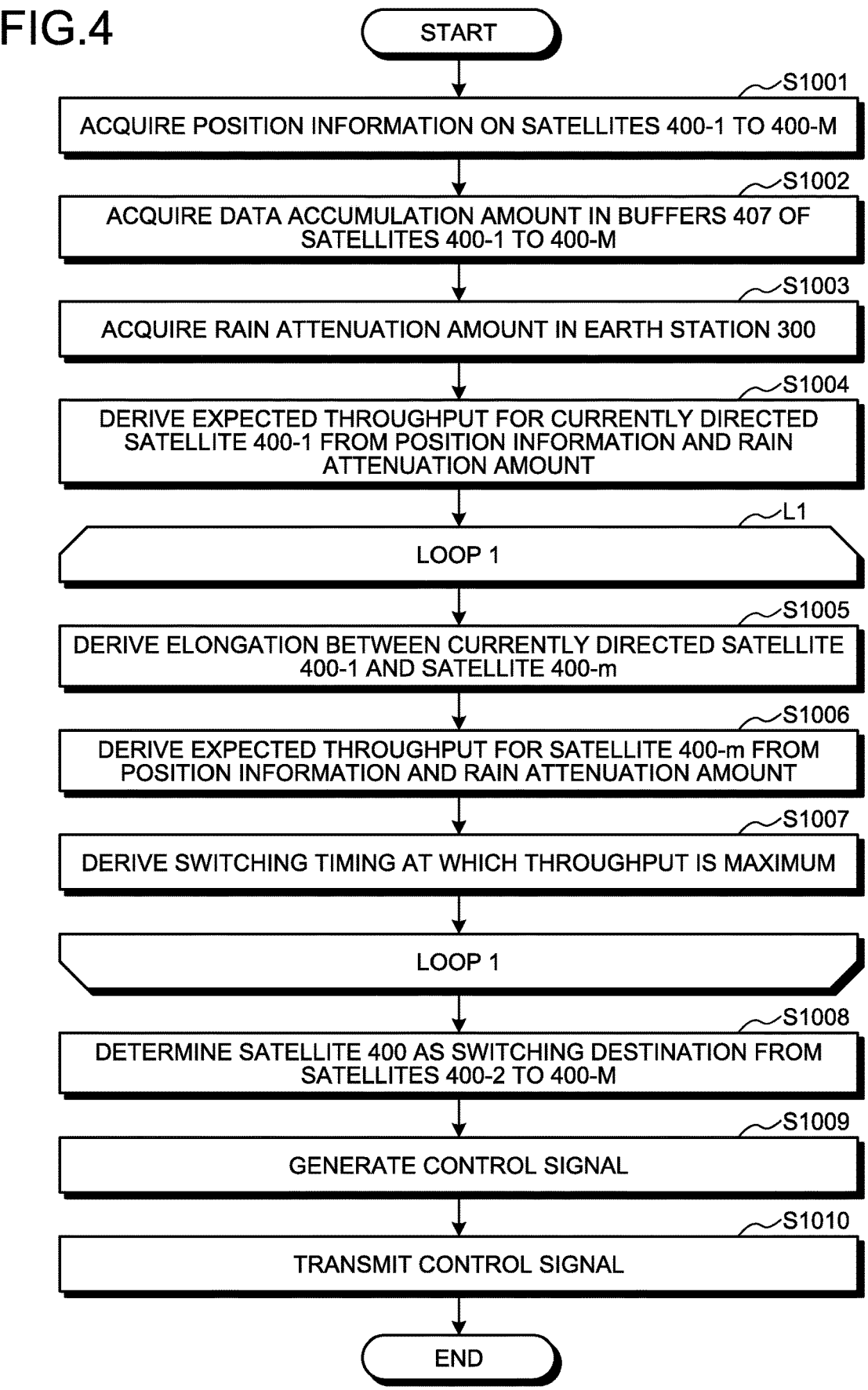
FIG. 4 is a flowchart illustrating an example of a process in which, in a case where an earth station switches a directed satellite, the scheduler apparatus determines a satellite to which the earth station is directed next and determines the timing at which the earth station switches the directed satellite.

Next, operations of the scheduler apparatus 100 are described. FIG. 4 is a flowchart illustrating an example of a process in which, in a case where the earth station 300 switches the directed satellite 400, the scheduler apparatus 100 according to the present embodiment determines the satellite 400 to which the earth station 300 is directed next and determines the timing at which the earth station 300 switches the directed satellite 400. The flowchart illustrated in FIG. 4 is merely an example, and the scheduler apparatus 100 may perform respective processes in a different order within a scope that an equivalent processing result can be obtained.

In the scheduler apparatus 100, first, the calculation unit 120 acquires, from the storage unit 130, position information on the satellite 400-1 to a satellite 400-M stored in advance (Step S1001). As described above, the calculation unit 120 may acquire telemetry signals from the earth station 300 and acquire the position information on the satellites 400-1 to 400-M from the telemetry signals. Here, the value of M is a natural number equal to or more than two and equal to or less than N that satisfies a condition that the number of satellites 400 passing through the visible range of the earth station 300 until the satellite 400-1 moves out of that visible range is M-1. For simplifying the description, it is assumed that, among the satellites 400-1 to 400-N included in the satellite system 700, a satellite 400-2 to the satellite 400-M are the satellites 400 that pass through the visible range of the earth station 300 until the satellite 400-1 moves out of the visible range. It is also assumed that the satellite 400-1 is a first orbiting satellite, the satellites 400-2 to 400-M are second orbiting satellite candidates, and the satellite 400 which is among the satellites 400-2 to 400-M and to which the earth station 300 directed to the satellite 400-1 is directed next is a second orbiting satellite.

In a case where the satellite 400 is an observation satellite such as an optical satellite or an SAR satellite and includes the buffer 407 that temporarily stores observation data therein, the earth station 300 stores therein information on the data accumulation amounts stored in the buffers 407 of the satellites 400-1 to 400-M due to the telemetry signals received from the satellites 400-1 to 400-M. The calculation unit 120 acquires the data accumulation amounts stored in the buffers 407 in the satellites 400-1 to 400-M from the earth station 300 (Step S1002).

The calculation unit 120 acquires the amount of rain attenuation in the earth station 300 (Step S1003). There are various methods for the calculation unit 120 to acquire the amount of rain attenuation. For example, the calculation unit 120 may derive the amount of rain attenuation on the basis of information on rainfall around the earth station 300, stored in advance in the storage unit 130, and the angle of elevation of the earth station 300 directed to the satellite 400-1, or may derive the amount of rain attenuation by using a pilot signal for indicating the rainfall state, the pilot signal being transmitted to the earth station 300 from the satellite 400-1.

The calculation unit 120 derives an expected throughput in a case where the earth station 300 continues to be directed to the satellite 400-1 to which the earth station 300 is currently directed until the satellite 400-1 moves out of the visible range of the earth station 300, on the basis of the position information on the satellite 400-1 acquired at Step S1001 and the amount of rain attenuation in the earth station 300 acquired at Step S1003 (Step S1004).

Figure 5:
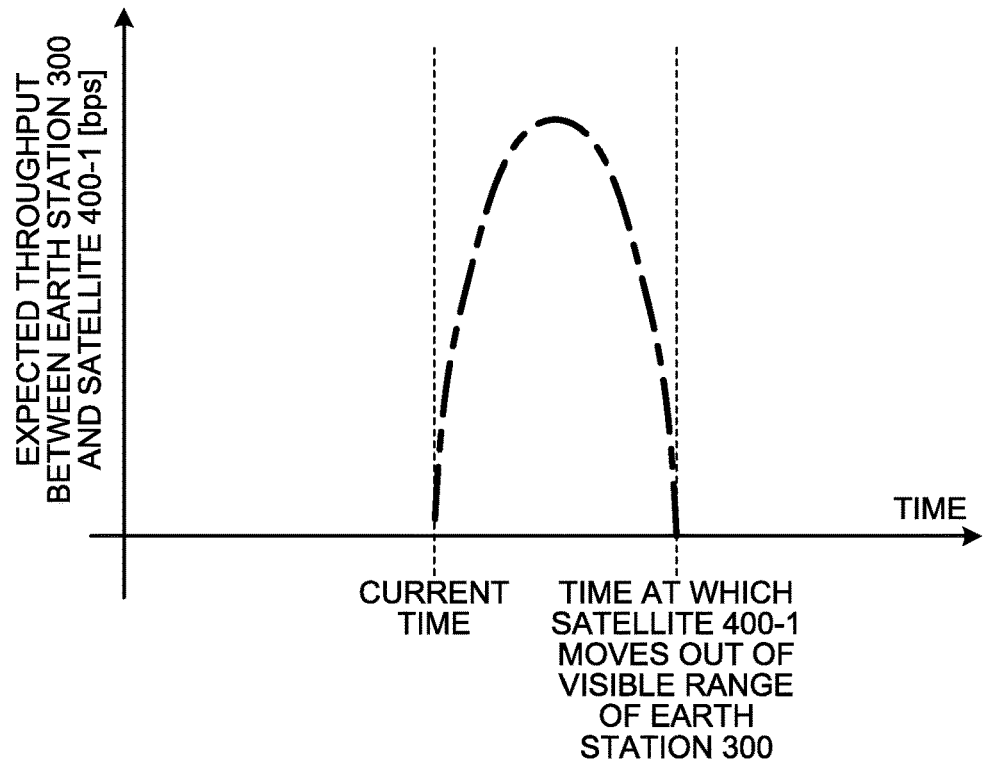
FIG. 5 is a diagram illustrating an example of an expected throughput derived by a calculation unit of the scheduler apparatus in a case where the earth station continues to be directed to a satellite to which the earth station is currently directed.

FIG. 5 is a diagram illustrating an example of an expected throughput derived by the calculation unit 120 of the scheduler apparatus 100 according to the present embodiment in a case where the earth station 300 continues to be directed to the satellite 400-1 to which the earth station 300 is currently directed. In FIG. 5, the horizontal axis represents time and the vertical axis represents the magnitude of the throughput. The time period during which the calculation unit 120 derives an expected throughput in a case where the earth station 300 continues to be directed to the satellite 400-1 is from the current time to the time at which the satellite 400-1 moves out of the visible range of the earth station 300. The calculation unit 120 stores the derived expected throughput in the storage unit 130.

The calculation unit 120 performs a process of a loop 1 (L1) to determine the timing at which the earth station 300 switches the directed satellite from the satellite 400-1 to which the earth station 300 is currently directed to another satellite 400, that is, any of the satellites 400-2 to 400-M. The loop 1 is a process repeated by the calculation unit 120, where the number of repetitions is equal to the number of the satellites 400 that pass through the visible range of the earth station 300 until the satellite 400-1 moves out of the visible range and is M-1 in this example.

The calculation unit 120 selects one satellite 400-$m$ from the satellites 400-2 to 400-M before starting the process of the loop 1. The value of m is a natural number equal to or more than two and equal to or less than M. The calculation unit 120 derives the elongation between the satellite 400-1 and the selected satellite 400-$m$ as viewed from the earth station 300 (Step S1005).

Figure 6:
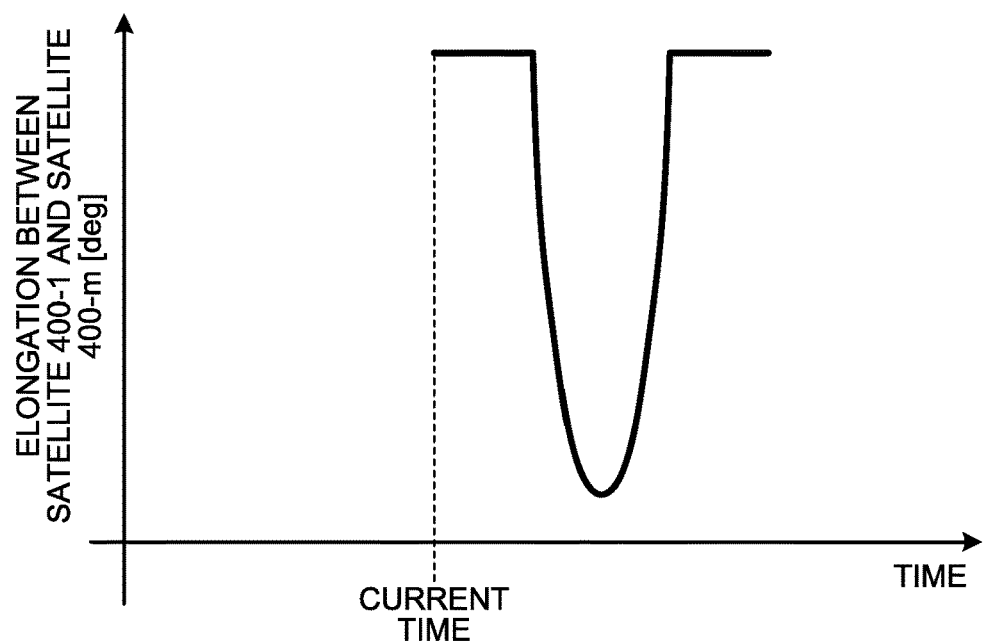
FIG. 6 is a diagram illustrating an example of the elongation derived by the calculation unit of the scheduler apparatus between a satellite to which the earth station is currently directed and a selected satellite as viewed from the earth station.

FIG. 6 is a diagram illustrating an example of the elongation that is derived by the calculation unit 120 of the scheduler apparatus 100 according to the present embodiment and is formed by the satellite 400-1 to which the earth station 300 is currently directed and the selected satellite 400-$m$ as viewed from the earth station 300. In FIG. 6, the horizontal axis represents time and the vertical axis represents the magnitude of the elongation between the satellite 400-1 and the satellite 400-$m$ as viewed from the earth station 300. In FIG. 6, the time at which the elongation is minimum means the time at which the satellite 400-1 and the satellite 400-$m$ are closest to each other. The time at which the elongation is minimum is the time at which the time period required for switching is the shortest when the earth station 300 changes the directed satellite 400 from the satellite 400-1 to the satellite 400-$m$. The calculation unit 120 stores the derived elongation in the storage unit 130. When obtaining the elongation, the calculation unit 120 may use position information on the satellites 400-1 to 400-M stored in advance in the storage unit 130 or may use position information on the satellites 400-1 to 400-M included in telemetry signals.

The calculation unit 120 derives an expected throughput in a case where the earth station 300 is directed to the satellite 400-$m$ on the basis of the position information on the satellite 400-$m$, the angle of elevation of the earth station 300 obtained from the position information, and the amount of rain attenuation in the earth station 300 (Step S1006).

Figure 7:
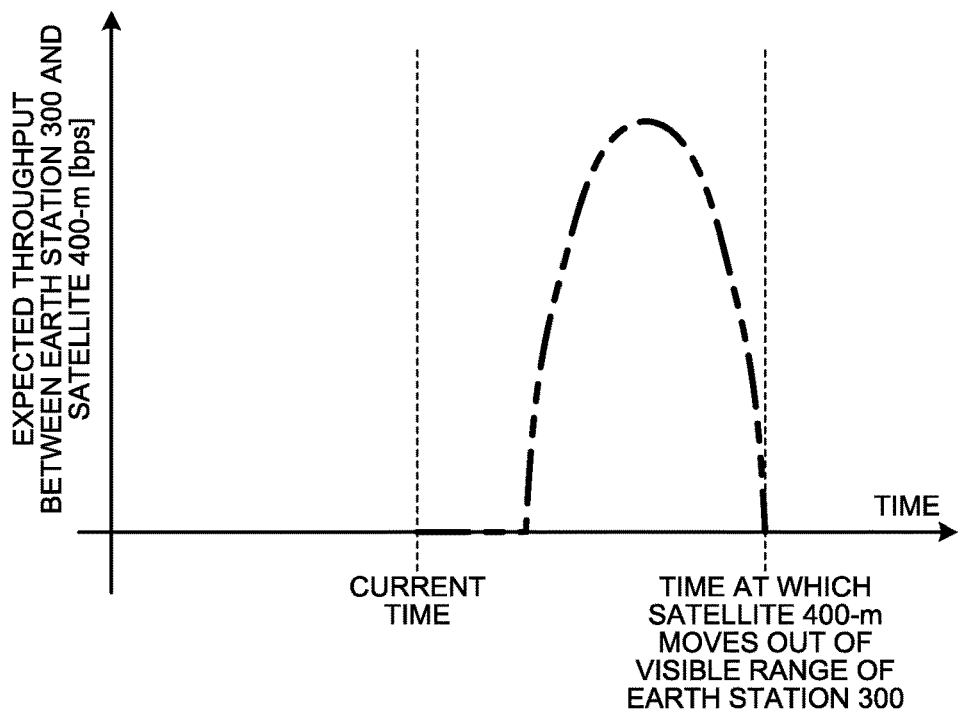
FIG. 7 is a diagram illustrating an example of an expected throughput derived by the calculation unit of the scheduler apparatus in a case where the earth station is directed to a selected satellite.

FIG. 7 is a diagram illustrating an example of an expected throughput derived by the calculation unit 120 of the scheduler apparatus 100 according to the present embodiment in a case where the earth station 300 is directed to the selected satellite 400-$m$. The calculation unit 120 stores, in the storage unit 130, the expected throughput that has been derived. Because the earth station 300 is currently directed to the satellite 400-1, the earth station 300 cannot receive a pilot signal for notifying the earth station 300 of the rainfall state directly from the satellite 400-$m$. Therefore, the calculation unit 120 may obtain the amount of rain attenuation in a case where the earth station 300 is directed to the satellite 400-$m$, from the rainfall state included in a pilot signal that the earth station 300 received from the satellite 400-1 and the elongation between the satellite 400-1 and the satellite 400-$m$ or from rainfall information stored in advance in the storage unit 130 and the elongation between the satellite 400-1 and the satellite 400-$m$.

The calculation unit 120 derives the switching timing of the directed satellite 400 at which the throughput of the earth station 300 is maximum on the basis of the expected throughput in a case where the earth station 300 continues to be directed to the satellite 400-1 derived at Step S1004, the elongation between the satellite 400-1 and the satellite 400-$m$ derived at Step S1005, and the expected throughput in a case where the earth station 300 is directed to the satellite 400-$m$ derived at Step S1006 (Step S1007). The calculation unit 120 derives, as the switching timing of the directed satellite 400, the timing at which the total value of the time integral value of the expected throughput in a case where the earth station 300 continues to be directed to the satellite 400-1 derived at Step S1004 and the time integral value of the expected throughput in a case where the earth station 300 is directed to the satellite 400-$m$ derived at Step S1006 is maximum, for example. In this manner, when determining the timing at which the earth station 300 switches the directed satellite, the calculation unit 120 estimates the amount of data that the earth station 300 can finally receive, and then determines the timing at which the maximum throughput is obtained in the earth station 300.

Figure 8:
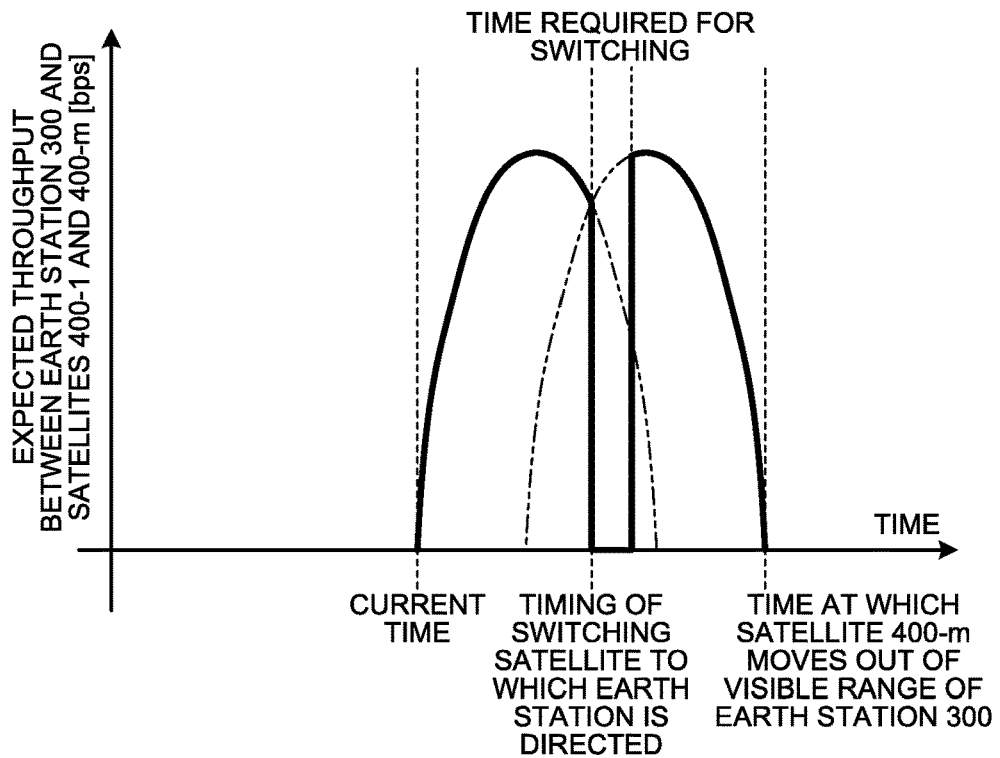
FIG. 8 is a schematic diagram illustrating a method of deriving, by the calculation unit of the scheduler apparatus, the timing at which the earth station switches a directed satellite.

FIG. 8 is a schematic diagram illustrating a method of deriving, by the calculation unit 120 of the scheduler apparatus 100 according to the present embodiment, the timing at which the earth station 300 switches a directed satellite. In FIG. 8, the thick line part denotes the throughput that the earth station 300 obtains from the satellite 400-1 and the satellite 400-$m$, and the time integral value of the thick line part represents the total value of the capacity of data received by the earth station 300 from the satellite 400-1 and the satellite 400-$m$. Further, in the thick line part in FIG. 8, the time during which the throughput of the earth station 300 is zero represents the time required for switching from the satellite 400-1 to the satellite 400-$m$ by the earth station 300. During the time required for switching, the earth station 300 cannot receive data either from the satellite 400-1 or the satellite 400-$m$. For example, the calculation unit 120 derives the time integral value of the throughput for all the conceivable switching timings in a round-robin manner, and can select one of all the switching timings, at which the time integral value of the throughput is maximum, as the timing of switching the directed satellite. However, the method of deriving the switching timing is not limited thereto. The calculation unit 120 can determine the time required for switching on the basis of the elongation derived at Step S1005, that is, the position information on the satellite 400-1 and the satellite 400-$m$.

When the processes at Steps S1005 to S1007 ends for the selected satellite 400-$m$, the calculation unit 120 selects an unselected satellite 400-$m$ from the satellites 400-2 to 400-M. The calculation unit 120 performs the process of the loop 1 on all the candidates of the satellite 400 to which the earth station 300 is directed next, that is, the satellites 400-2 to 400-M. The calculation unit 120 derives the switching timing at which the throughput of the earth station 300 is maximum and the maximum throughput obtained in a case where the directed satellite 400 is switched at that switching timing, for each of the satellites 400-2 to 400-M.

When the process of the loop 1 ends for the satellites 400-2 to 400-M, the calculation unit 120 determines, among the satellites 400-2 to 400-M, the satellite 400 to which the earth station 300 switches a directed satellite from the satellite 400-1, on the basis of the switching timing and the maximum throughput for each candidate of the satellite 400 to which the earth station 300 is directed next, that is, each of the satellites 400-2 to 400-M, derived in the process of the loop 1 (Step S1008).

That is, in the process of the loop 1 and the process at Step S1008, the calculation unit 120 determines the satellite 400 to which the earth station 300 directed to the satellite 400-1 is directed next and the switching timing at which the earth station 300 switches a directed satellite from the satellite 400-1 to the satellite 400 to which the earth station 300 is directed next, on the basis of the times required for switching by the earth station 300 from the satellite 400-1 to the satellites 400-2 to 400-M, a future expected throughput between the earth station 300 and the satellite 400-1, and a future expected throughput between the earth station 300 and each of the satellites 400-2 to 400-M.

The calculation unit 120 can determine the satellite 400 to which the earth station 300 is directed next and the switching timing by various methods. For example, the calculation unit 120 may simply select the satellite 400 that provides the maximum throughput and the timing of switching to that satellite 400. Further, the calculation unit 120 may select, as the satellite 400 to which the earth station 300 is directed next, the satellite 400 in which the data accumulation amount is maximum on the basis of the data accumulation amount in the buffer 407 of each satellite 400 acquired at Step S1002. The calculation unit 120 determines the directed satellite 400 while taking the data accumulation amount in the buffer 407 of each satellite 400 into consideration. In a case where a telemetry signal includes information on the data type and priorities are classified in accordance with the data type, the calculation unit 120 may select the satellite 400 that relays data with a higher priority as the satellite 400 to which the earth station 300 is directed next, on the basis of the data type. The calculation unit 120 determines the directed satellite 400 while taking the priority of data accumulated in the buffer 407 of each satellite 400 into consideration. Further, the calculation unit 120 may select the satellite 400 to which the earth station 300 is directed next by using a plurality of elements described above including the magnitude of the throughput, the data accumulation amount, and the data type.

The calculation unit 120 generates a control signal indicating the satellite 400 selected at Step S1008 to which the earth station 300 is directed next and including the timing of switching to that satellite 400 (Step S1009). Here, the control signal is a signal indicating the satellite 400 and the radiating angle of the earth station 300, for example. The control signal can have various formats in accordance with the configurations of the satellite 400 and the earth station 300. As for information on the satellite 400 to which the earth station 300 is directed next and the switching timing, the calculation unit 120 can generate a control signal in a format of control information for determining the satellite 400 and the direction of a beam from the earth station 300 for each time.

The interface 110 then transmits the control signal generated by the calculation unit 120 at Step S1009 to the earth station 300 and the satellites 400-1 to 400-M (Step S1010). It suffices that the interface 110 transmits the control signal to the earth station 300 via the control station 200 through a land line or the like. Further, as for the control signal to the satellite 400-1, the interface 110 may transmit the control signal via the earth station 300 that is directed to the satellite 400-1. As for the control signal to each of the satellites 400-2 to 400-M, in a case where there is an earth station that is other than the earth station 300 and is directed to the satellite, the interface 110 may transmit the control signal via that earth station. Furthermore, in a case where the satellite system 700 has a network configuration including a data relay satellite that is not illustrated in FIG. 1, it suffices that the interface 110 transmits the control signals to the satellites 400-2 to 400-M via the data relay satellite. The interface 110 can transmit the control signals by various methods in accordance with the network configuration of the satellite system 700. In the flowchart of FIG. 4, it is assumed that the process in the calculation unit 120 is a calculating step and the process in the interface 110 is a transmitting step.

Figure 9:
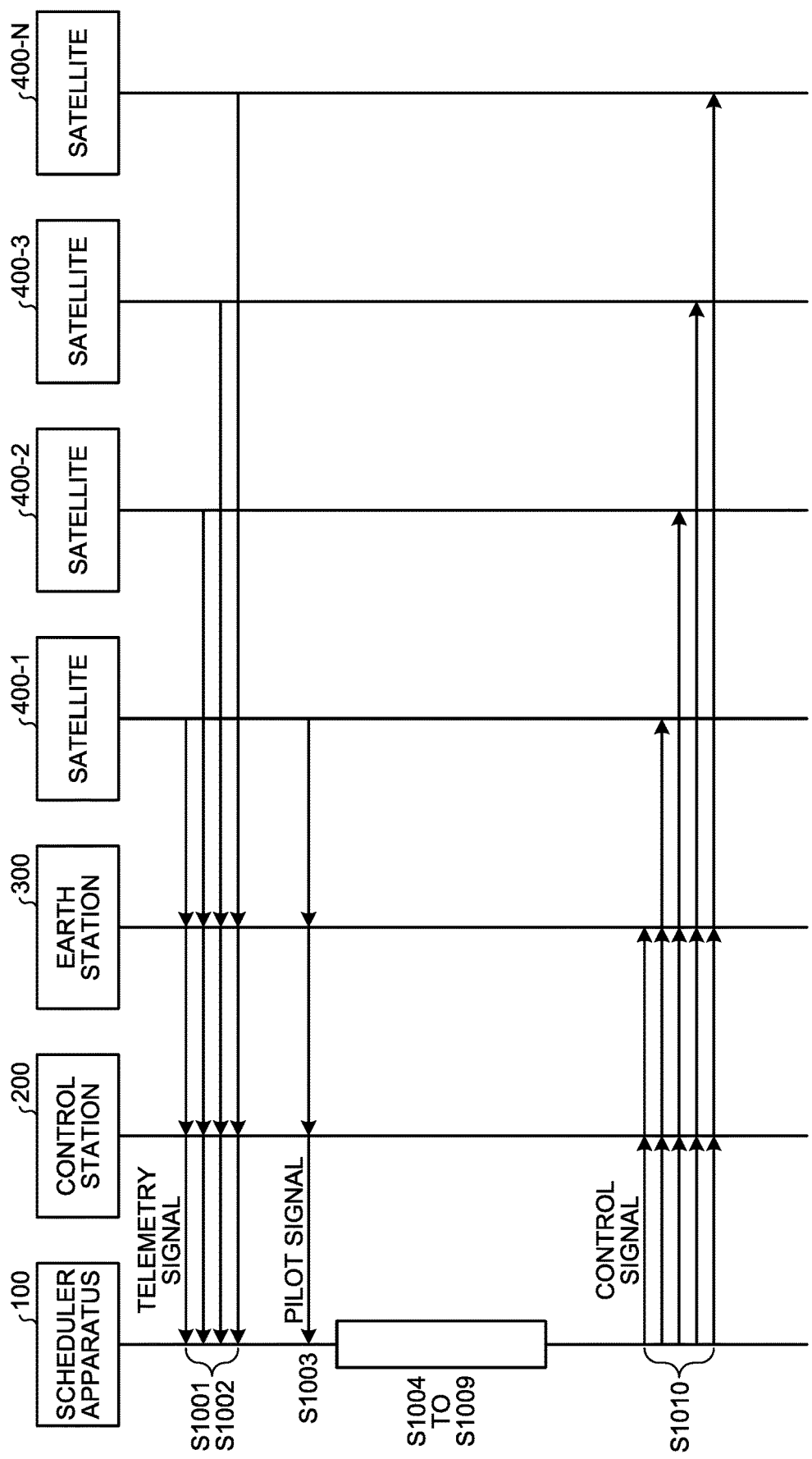
FIG. 9 is a sequence diagram illustrating signals transmitted and received in a process in which the scheduler apparatus determines a satellite to which the earth station is directed next and the timing of switching the directed satellite.

FIG. 9 is a sequence diagram illustrating signals transmitted and received in a process in which the scheduler apparatus 100 according to the present embodiment determines the satellite 400 to which the earth station 300 is directed next and the timing of switching the directed satellite 400. While it is conceivable that the processes in the flowchart illustrated in FIG. 4 are performed by the scheduler apparatus 100 in accordance with the sequence diagram illustrated in FIG. 9, this is not a limitation. In FIG. 9, the scheduler apparatus 100 determines the satellite 400 to which the earth station 300 is directed next and the switching timing and generates a control signal, immediately after acquiring position information and rain attenuation information. Alternatively, the scheduler apparatus 100 may determine the satellite 400 to which the earth station 300 is directed next and the switching timing and generate the control signal with any period.

In the processes described above, although the calculation unit 120 takes into account only a satellite 400 to which the earth station 300 is directed next, this is not a limitation. In an environment where change of the rain attenuation amount over time is small, such as when it is fine weather, the calculation unit 120 may take up to the second next or the third next switching destination satellite 400 to which the earth station 300 is directed into consideration and determine the satellite 400 that is a switching destination and the switching timing such that the maximum throughput of the earth station 300 is obtained.

In the above descriptions, a case where the number of the earth stations 300 is one has been described. However, the satellite system 700 can include a plurality of earth stations 300 as described above. In a case where the satellite system 700 is in a mode of a network including a plurality of earth stations 300, the calculation unit 120 may derive the amount of rain attenuation in each of the earth stations 300 on the basis of information on the rainfall state included in a pilot signal received from the satellite 400, and determine the earth station 300 the amount of rain attenuation of which is small as the earth station 300 to which the satellite 400 transmits data. By this method, in a case where there are a plurality of earth stations 300, the satellite 400 can transmit data to the earth station 300 the amount of rain attenuation of which is small.

Next, a hardware configuration of the scheduler apparatus 100 is described. In the scheduler apparatus 100, the interface 110 is implemented by an interface circuit and the like. The interface circuit is a network interface card, for example. The storage unit 130 is implemented by a memory. The calculation unit 120 is implemented by a processing circuit. That is, the scheduler apparatus 100 includes a processing circuit that determines the satellite 400 to which the earth station 300 is directed next and the timing of switching the directed satellite 400. The processing circuit may be a central processing unit (CPU) that executes a program stored in a memory and the memory, or may be dedicated hardware.

Figure 10:
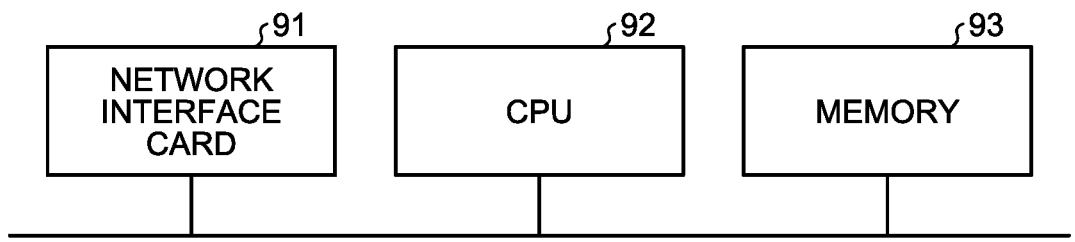
FIG. 10 is a diagram illustrating an example of a case where a processing circuit of the scheduler apparatus is configured from a CPU and a memory.

FIG. 10 is a diagram illustrating an example of a case where a processing circuit of the scheduler apparatus 100 according to the present embodiment is configured from a CPU and a memory. A network interface card 91 implements the interface 110 described above. In a case where the processing circuit is configured from a CPU 92 and a memory 93, functions of the processing circuit of the scheduler apparatus 100 are implemented by software, firmware, or a combination of software and firmware. The software or the firmware is described as a program and is stored in the memory 93. The functions of the processing circuit are implemented by the CPU 92 reading and executing the program stored in the memory 93. That is, in the scheduler apparatus 100, the processing circuit includes the memory 93 for storing therein programs, which will eventually execute determination of the satellite 400 to which the earth station 300 is directed next and the timing of switching the directed satellite 400. Further, it can be said that these programs cause a computer to perform a procedure and a method of the scheduler apparatus 100. In this example, the CPU 92 may be a processing device, a calculation device, a microprocessor, a microcomputer, a processor, a digital signal processor (DSP), or the like. Further, for example, the memory 93 corresponds to a nonvolatile or volatile semiconductor memory such as a random access memory (RAM), a read only memory (ROM), a flash memory, an erasable programmable memory (EPROM), or an eclectically EPROM (EEPROM), a magnetic disk, a flexible disk, an optical disk, a compact disk, a mini disk, or a digital versatile disc (DVD). The memory 93 may be common to a memory that implements the storage unit 130.

Figure 11:
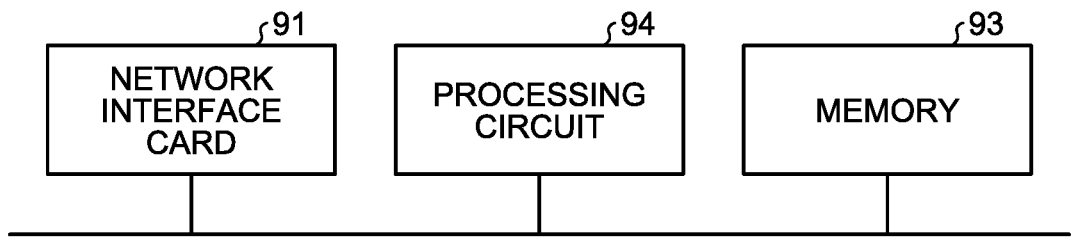
FIG. 11 is a diagram illustrating an example of a case where the processing circuit of the scheduler apparatus is configured by dedicated hardware.

FIG. 11 is a diagram illustrating an example of a case where the processing circuit of the scheduler apparatus 100 according to the present embodiment is configured by dedicated hardware. When the processing circuit is dedicated hardware, a processing circuit 94 illustrated in FIG. 11 corresponds to, for example, a single circuit, a composite circuit, a programmed processor, a parallel programmed processor, an application specific integrated circuit (ASIC), an field programmable gate array (FPGA), or a combination of these elements. The respective functions of the scheduler apparatus 100 can be realized by the processing circuit 94 for each function independently or can be realized by the processing circuit 94 collectively.

As for the respective functions of the scheduler apparatus 100, it is possible to configure that some of these functions are realized by dedicated hardware and the others are realized by software or firmware. In this manner, the processing circuit can realize the respective functions described above by dedicated hardware, software, firmware, or a combination of these elements.

As described above, according to the present embodiment, in the scheduler apparatus 100, the calculation unit 120 determines the satellite 400 to which the earth station 300 is directed next and the timing of switching a directed satellite to the next satellite 400, on the basis of position information on the satellites 400 and the amount of rain attenuation in the earth station 300 in such a manner that the throughput of the earth station 300 is maximized. With this configuration, it is possible to efficiently operate the earth station 300 in the satellite system 700 that is configured from a plurality of orbiting satellites. The earth station 300 can efficiently communicate with the satellite 400 to which the earth station 300 is directed.

The configurations described in the above embodiments are only examples of an aspect of the present invention. The configurations can be combined with other well-known techniques, and part of each configuration can be omitted or modified without departing from the scope of the present invention.

REFERENCE SIGNS LIST 100 scheduler apparatus, 110 interface, 120 calculation unit, 130 storage unit, 200 control station, 300 earth station, 400-1 to 400-N satellite, 500-1, 500-2 satellite orbit, 600 beam, 700 satellite system.

The invention claimed is:

1. A scheduler apparatus comprising:
a calculator to determine, on a basis of a time required for switching from a first orbiting satellite that is an orbiting satellite to which an earth station is currently directed to a second orbiting satellite candidate that is an orbiting satellite as a candidate for a second orbiting satellite that is an orbiting satellite to which the earth station is directed next, a future expected throughput between the earth station and the first orbiting satellite, and a future expected throughput between the earth station and the second orbiting satellite candidate, the second orbiting satellite and a switching timing at which the earth station switches a directed satellite from the first orbiting satellite to the second orbiting satellite; and
an interface to transmit information on the second orbiting satellite and the switching timing determined by the calculator.

2. The scheduler apparatus according to claim 1, wherein the calculator determines a future expected throughput between the earth station and the orbiting satellite on a basis of position information on the orbiting satellite and a rain attenuation amount in the earth station for each orbiting satellite.

3. The scheduler apparatus according to claim 2, further comprising a storage to store information on a rainfall amount, wherein
the calculator derives the rain attenuation amount in the earth station for each orbiting satellite, on a basis of the information on the rainfall amount and an angle of elevation of the earth station with respect to the orbiting satellite.

4. The scheduler apparatus according to claim 2, wherein the calculator derives the rain attenuation amount in the earth station for each orbiting satellite, on a basis of information on a rainfall state included in a pilot signal received by the earth station from the first orbiting satellite and an angle of elevation of the earth station with respect to the orbiting satellite.

5. The scheduler apparatus according to claim 1, wherein the calculator determines the time required for switching on a basis of position information on the first orbiting satellite and position information on the second orbiting satellite candidate.

6. The scheduler apparatus according to claim 1, wherein the interface transmits the information on the second orbiting satellite and the switching timing as control information for determining the orbiting satellite and a direction of a beam from the earth station for each time.

7. The scheduler apparatus according to claim 1, wherein the calculator derives the switching timing on a basis of a time integral value of the future expected throughput between the earth station and the first orbiting satellite and a time integral value of the future expected throughput between the earth station and the second orbiting satellite candidate.

8. The scheduler apparatus according to claim 7, wherein the calculator derives, as the switching timing, a timing at which a total value of the time integral value of the future expected throughput between the earth station and the first orbiting satellite and the time integral value of the future expected throughput between the earth station and the second orbiting satellite candidate is maximum.

9. The scheduler apparatus according to claim 8, wherein the calculator determines the second orbiting satellite on a basis of a data accumulation amount that indicates a data amount accumulated in a buffer of the second orbiting satellite candidate, the data accumulation amount being included in a telemetry signal transmitted from the second orbiting satellite candidate.

10. The scheduler apparatus according to claim 8, wherein the calculator determines the second orbiting satellite on a basis of a data type that indicates a type of data accumulated in a buffer of the second orbiting satellite candidate, the data type being included in a telemetry signal transmitted from the second orbiting satellite candidate.

11. The scheduler apparatus according to claim 8, wherein the calculator derives, for each second orbiting satellite candidate, a maximum total value of the time integral value of the future expected throughput between the earth station and the first orbiting satellite and the time integral value of the future expected throughput between the earth station and the second orbiting satellite candidate, and determines the second orbiting satellite candidate with which the maximum total value is maximum as the second orbiting satellite.

12. The scheduler apparatus according to claim 8, wherein in a mode in which a network includes a plurality of earth stations, the calculator derives a rain attenuation amount in the plurality of earth stations on a basis of information on a rainfall state included in a pilot signal received from the orbiting satellite, and determines an earth station in which a rain attenuation amount is small as an earth station that is a destination of data transmitted from the orbiting satellite.

13. A scheduling method comprising: determining, on a basis of a time required for switching from a first orbiting satellite that is an orbiting satellite to which an earth station is currently directed to a second orbiting satellite candidate that is an orbiting satellite as a candidate for a second orbiting satellite that is an orbiting satellite to which the earth station is directed next, a future expected throughput between the earth station and the first orbiting satellite, and a future expected throughput between the earth station and the second orbiting satellite candidate, the second orbiting satellite and a switching timing at which the earth station switches a directed satellite from the first orbiting satellite to the second orbiting satellite; and transmitting information on the second orbiting satellite and the switching timing determined at the determining.

* * * * *